June 6, 1933.   P. COURTEILLE   1,912,888
TIGHT HOLDING NUT
Filed April 18, 1928

Inventor
Paul Courteille
By Addison A. Armstrong
His Attorney

Patented June 6, 1933

1,912,888

UNITED STATES PATENT OFFICE

PAUL COURTEILLE, OF VINCENNES, FRANCE

TIGHT HOLDING NUT

Application filed April 18, 1928, Serial No. 270,940, and in France April 19, 1927.

My invention relates to an improvement in tight holding nuts for screws and bolts of the type in which the nut may be securely locked to the thread upon which it is placed.

The object of the invention is to provide a nut of the character indicated with a bifurcated projection over which a counter nut is adapted to be fitted and clamp the nut tightly to the bolt or screw upon which it is placed.

Another object of the invention is to provide the screw with which the nut is used with a plurality of longitudinal grooves into which flexible teeth provided on the bifurcated projection of the nut are adapted to penetrate when pressed inwardly by the counter-nut.

A more specific object of the invention is to provide a nut with a bifurcated conical male member and a counter nut with a corresponding female member, the said female member being adapted to tightly clamp the male member to the threads upon which the nut is mounted.

Other objects of the invention will be obvious to those skilled in the art to which the invention relates in the following description taken in connection with the accompanying drawing, in which—

Figure 1:
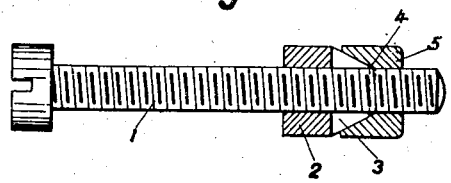
Fig. 1 is a view of my improved nut and counter nut in section applied to a screw.

Referring to the drawing, 1 designates a screw and 2 my improved nut. The said nut is provided with a conical extension 3, in which is cut a notch 4 for imparting flexibility thereto and allowing said conical extension to be clamped on the screw 1 by means of a counter-nut 5, which, as shown in Fig. 1 is provided with a conical recess corresponding to the projection 3.

Once the nut is in place upon its screw, the counter-nut 5 is screwed home, which causes the conical recesses thereof to tightly engage the conical extension 3 of screw 1 and cause the elements of said extension to tightly clamp the body of screw 1. The nut 3 is thus rendered perfectly tight holding.

Figure 2:
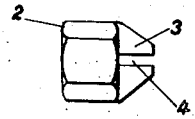
Fig. 2 is a side elevational view of the nut.
Figure 3:
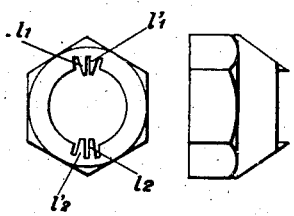
Fig. 3 shows a modified form of nut in front and side elevation.
Figure 4:
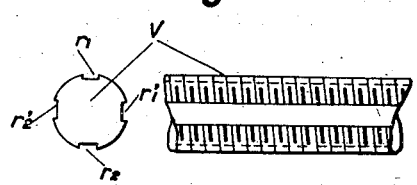
Fig. 4 shows a form of screw for use with the nut of Fig. 3 in partial side and end elevation.

In the embodiment shown in Figs. 3 and 4, the nut is provided with four tongues $l_1$, $l_2$, $l_3$ and $l_4$ formed by cutting notches in the conical extension similar to notches 4 of Fig. 2 but which are diametrically disposed in pairs on said extension. The screw V for use with this nut (Fig. 4) is of the ordinary type in which are provided four slots $r_1$, $r_2$, $r_3$ and $r_4$.

The operation of this embodiment is analogous to that previously described. The nut is tightened against the member to be secured and the counter-nut turned which causes the conical female member thereof to exert a pressure on the tongues which fall in line with one of the longitudinal notches of screw V and forces said tongues to enter their corresponding notch, thereby preventing unscrewing of the nut.

For dismounting, it is merely necessary, after loosening the counter-nut to slide a sharp tool under the tongues which are easily displaced due to their flexibility. Once the tongues are released from the notch the main nut may be easily loosened. This embodiment has the advantage of being easily dismounted.

In the case of a screw having a very small cross-section, instead of providing four slots therein, I may provide only two or even a single one, in which case the number of tongues provided correspond to the number of slots.

Figure 5:
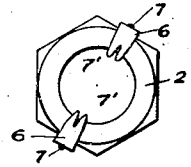
Fig. 5 is a front elevational view of a modified form of nut similar to Fig. 3.

In Fig. 5 is illustrated a nut similar to that shown in Fig. 3 but wherein the nut 2 has thin metallic strips secured to the flat sides of the nut at opposite points by means of solder or preferably by means of small screws or rivets 7. Each strip has an inwardly projecting tongue 7' similar to the tongues $l_1$, $l_2$, $l'_1$, $l'_2$ of Fig. 3.

The operation of the nut in Fig. 5 is identical to that described in connection with Fig. 3, the only difference being that the tongues do not form an integral part of the nut.

Likewise the counter-nut may in certain cases be substituted by a mechanical snap.

While I have shown what I deem to be the preferable form of my device I do not wish to be limited thereto as there might be various changes made in the details of construction and the arrangement of parts without departing from the spirit of the invention comprehended within the scope of the appended claims.

Having described my invention what I claim as new and desire to secure by Letters Patent is:

1. A tight holding bolt, comprising in combination, a threaded male element, a nut for said male element, a counter-nut for said nut, a plurality of flexible conically disposed tongues carried by said nut, a plurality of longitudinal slots in said male element and means on said counter-nut for causing a tongue to enter one of said slots when said counter-nut is tightened on said nut whereby loosening of said nut on said male element is prevented.

2. A tight holding bolt, comprising in combination, a threaded male element, a nut for said male element, a counter-nut for said nut, a flexible conically disposed tongue carried by said nut, a longitudinal slot in said male element and a conical flange on said counter-nut for causing said tongue to enter said slot when said counter-nut is tightened on said nut whereby loosening of said nut on said male element is prevented.

3. A tight holding bolt, comprising in combination, a threaded male element, a nut for said male element, a counter-nut for said nut, a pair of diametrically disposed flexible conically extending tongues carried by said nut, four longitudinally extending symmetrically disposed slots in said male element and a conical flange on said counter-nut for causing one of said tongues to enter one of said slots when said counter-nut is tightened on said nut whereby loosening of said nut on said male element is prevented.

4. A tight holding bolt, comprising in combination, a threaded male element, a nut for said male element, a counter-nut for said nut, a pair of diametrically disposed flexible conically extending tongues carried by said nut, four longitudinally extending symmetrically disposed slots in said male element and means on said counter-nut for causing one of said tongues to enter one of said slots when said counter-nut is tightened on said nut whereby loosening of said nut on said male element is prevented.

5. A tight holding bolt, comprising in combination, a threaded male element, a main nut for said male element, a counter-nut for said nut, a plurality of thin metallic strips secured to said main nut, a plurality of longitudinal slots in said male element and means on said counter nut for causing a strip to enter one of said slots when said counter-nut is tightened on said main nut whereby loosening of said nut on said male element is prevented.

6. A tight holding bolt, comprising in combination, a threaded male element, a nut for said male element, a counter-nut for said nut, a plurality of thin metallic strips secured to said nut, longitudinal slots in said male element and a conical flange on said counter-nut for causing one of said strips to enter one of said slots when said counter-nut is tightened on said nut whereby loosening of said nut on said male element is prevented.

In testimony whereof I hereunto affix my signature.

PAUL COURTEILLE.